April 8, 1941.    E. J. PRATT    2,237,766
FILTERING DEVICE
Filed May 17, 1939

Inventor.
Elmer J. Pratt.
by Parker & Carter
Attorneys.

Patented Apr. 8, 1941

2,237,766

UNITED STATES PATENT OFFICE 2,237,766

FILTERING DEVICE

Elmer J. Pratt, Chicago, Ill.

Application May 17, 1939, Serial No. 274,251

8 Claims. (Cl. 210—166)

This invention relates to filtering devices and has for its object to provide a new and improved device of this description.

The invention has as a further object to provide a filtering device for filtering fluid flowing through a passageway and for moving a portion of the filtering device to open up the passageway through the filtering device responsive to variations in temperature. The invention has as a further object to provide a filtering device for filtering fluid flowing through a passageway wherein the filtering device has a section thereof normally in a filtering position, but which is adapted to be moved at a predetermined temperature to open up a free unobstructed passageway through the filtering device. The invention has as a further object to provide a filtering device for filtering fluid flowing through a valve, said valve and filtering device being associated with a thermostat, the thermostat at a certain temperature moving to open the valve and at a higher temperature to move a portion of the filtering device to provide an open passageway through the filtering device. The invention has other objects which are more particularly pointed out in the accompanying description.

Referring now to the drawing.

Like numerals refer to like parts throughout the several figures.

Figure 1:
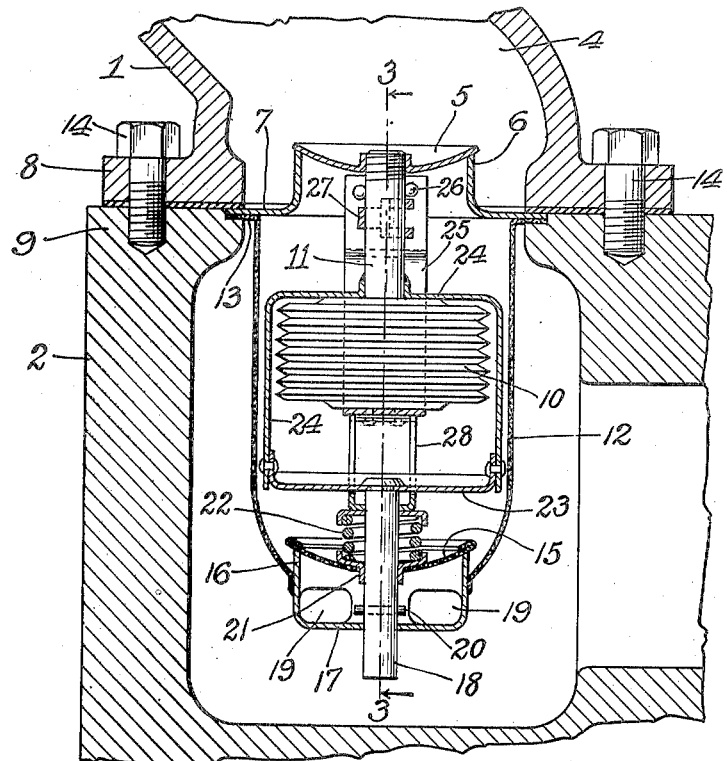
Fig. 1 is a sectional view through one form of device embodying the invention.
Figure 2:
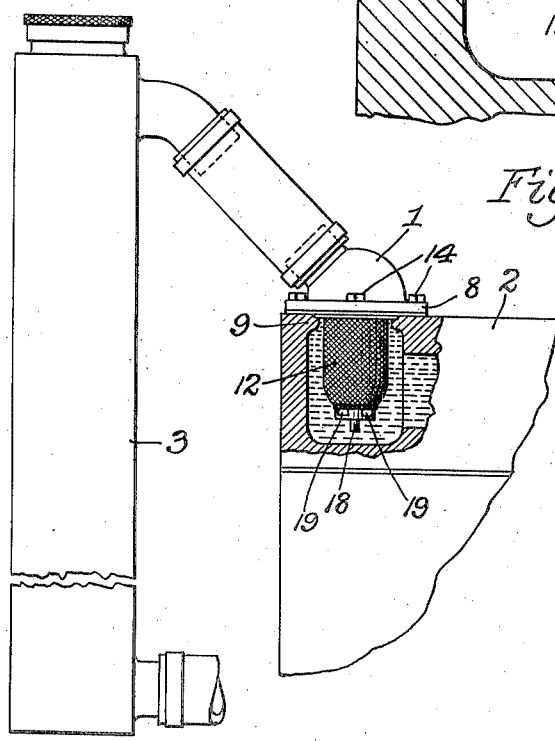
Fig. 2 is a view showing the device as used in the circulatory system of an internal combustion engine.

Referring now to the drawing, I have shown one form of the device as used in the cooling system of an internal combustion engine. In this construction there is a connection 1 leading from the engine jacket 2 to the radiator 3, the cooling fluid being circulated through this radiator and cooled thereby. Located in the passageway 4 is a valve 5 which controls the fluid passing therethrough. Any form of valve may be used. As herein shown this valve engages a seat 6 which is provided with a flange 7 held in position between the flange 8 on the connection 1 and the part 9 connected with the engine. The valve 5 is actuated by a thermostat 10 which as here shown is of the bellows type and which has a member 11 connected with the top of the bellows and connected with the valve 5. This bellows contains an expansible fluid which expands under heat and expands the bellows so as to lift the valve 5 and open the passageway therethrough.

If there are solid particles in the fluid passing through the passageway, these solid particles may lodge between the valve 5 and its seat 6 so as to hold the valve open and thereby prevent the thermostat and the valve from properly operating to close the valve when it should be closed. In order to prevent this condition, I provide a filter 12 which extends across the passageway and surrounds the thermostat. This filter is supported in any desired manner, as by means of a flange 13 which is also clamped between the members 8 and 9. This clamping is secured by means of the fastening devices 14.

The filter may be made of any desired material, preferably metal mesh or screen, and is preferably formed as a tubular hollow filter. This filter will stop the solid particles from passing through it and coming into contact with the thermostat or the valve. Under ordinary conditions, a filter having sufficient area will operate for a considerable period of time before these solid particles will materially retard or restrict the passage of fluid therethrough. When an excessive amount of particles, however, adhere to the filter, this restricts the flow of the fluid therethrough and the temperature of the fluid will rapidly rise above the desired limit. I have therefor provided a means for opening a free unobstructed passageway through the filtering device when this temperature rises above the desired limit. One construction for securing this result is herein shown. This filter is open at one end, the upper end in this case. At the lower end of the filter is a filter section 15 which is movably mounted in position and which is normally in filtering position to act to filter fluid passing therethrough. This filter section may be mounted in any suitable way. As herein shown, there is an opening in the main body of the filter into which extends a holding device 16, attached to the filter body and which is open at one end, the filter section 15 resting on this open end so as to close the end, thus compelling the fluid to pass through the filter section.

This holding device preferably has a wall 17 at its other end and is provided with an opening through which a stem 18 passes. There are a series of openings 19 in the holding device 16 through which the fluid passes which passes through the filter section 15. The stem 18 passes through the filter section 15 and has a sliding connection therewith and is provided at one side of the filter section 15 with an engaging member 20 for engaging the filter section under predetermined conditions. I prefer to provide a member 21 for the opening in the filter section for the stem 18. There is a spring 22 which surrounds the stem 18 and which normally presses the filter section 15 against the holding device 16. This spring preferably engages the member 21 as shown. The stem 18 is connected with the thermostat 10 so as to be moved thereby. Any suitable arrangement for this purpose may be used. As shown herein, the stem 18 is connected with a supporting member 23 which extends along the thermostat and which is provided with the part 24 extending across the top thereof.

When the temperature of the fluid surrounding the thermostat 10 reaches a predetermined point, the thermostat expands and moves the valve 5 to open position, so that the fluid may pass therethrough. During this movement the stem 18 is also moved upwardly, but simply slides through the filter section 15. If the filter becomes clogged by solid material in the fluid, so as to reduce or stop the flow of fluid through the passageway, the temperature rises and the thermostat 10 is further opened. This brings the engaging device 20 to position to engage the filter section 15 and move it away from its seat, so as to provide an open passageway through the filter for the fluid. When the temperature falls to a predetermined degree, the thermostat contracts or collapses. This first movement lowers the stem 18 so as to disconnect the engaging member 20 from the filter section 15 and the spring 22 then moves the filter section to its closed filtering position. If the filtering device is still clogged, then the operation above set out is repeated.

When the temperature of the fluid surrounding the thermostat lowers sufficiently, the thermostat then acts to close the valve 5. It will be noted that with this device, whenever the screen becomes clogged so as to reduce the amount of fluid passing through the passageway sufficiently to cause the temperature in the engine jacket to rise to a dangerous point unless relieved, the thermostat opens the screen section 15 so as to provide an unobstructed open passageway through the screen to let the fluid flow freely and unobstructed through the screen, so as to cause the temperature to be lowered and thereby prevent injury to the parts. It will be seen that in this construction there is a screening device extending across the passageway and a thermostat in the screen, this thermostat controlling two movable parts at opposite ends of the screening device, these parts being controlled not simultaneously, but successively, to open up the passageway through the screen.

Figure 3:
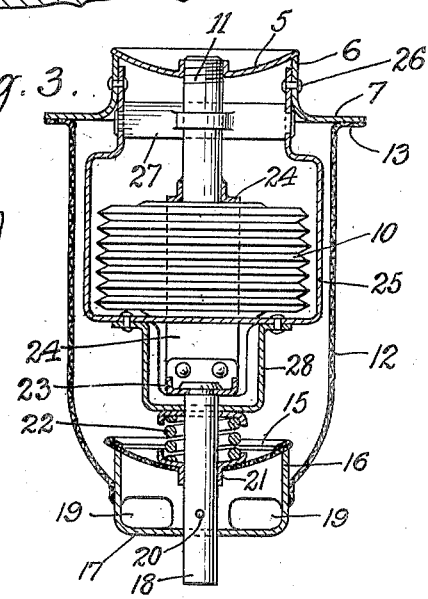
Fig. 3 is a sectional view taken on line 3—3 of Fig. 1.

The bellows 10 is supported in any suitable manner. As herein shown, there is a supporting device 25 which extends underneath the bellows and upward along the sides thereof and which is connected to the seat portion 6 by the connecting devices 26. The member 11 of the thermostat slides through a guide 27 which is attached to the supporting device 25, see Fig. 3. Attached to the support 25 is a member 28 which has a hole in it and which also acts to guide the pin 18 as it moves up and down.

I claim:

1. A filtering device for filtering fluid flowing through a passageway, comprising a filter body open at both ends, a filter section extending across the opening at one end of the filter device for filtering the fluid passing through said opening, and temperature control means for moving said filter section to provide a free passageway of fluid through the filtering device.

2. A filtering device for filtering fluid flowing through a passageway, comprising a perforated filter body open at both ends, a filter section extending across the opening at one end of the filter device for filtering the fluid passing through said opening, and an automatically acting controlling device connected with said filter section for moving it to an open position.

3. A filtering device for filtering fluid flowing through a passageway, comprising a filter body open at both ends, a filter section extending across the opening at one end of the filter device for filtering the fluid passing through said opening, and an automatic controlling device connected with said filter section for moving it to an open position, said controlling device being movably connected with said filter section so that it is moved a predetermined amount before moving said filter section to its open position.

4. A filtering device for filtering fluid flowing through a passageway, comprising a filter body open at both ends, a filter section extending across the opening at one end of the filter device for filtering the fluid passing through said opening, a controlling device connected with said filter section for moving it to an open position, said controlling device being movably connected with said filter section so that said controlling device is moved a predetermined amount before moving said filter section to its open position, and a spring energized by the movement of said filter section when the filter section is moved to its open position and which assists in returning said filter section to its closed position, for opposing movement of said filter section.

5. A filtering device for filtering fluid flowing through a passageway, comprising a filter body open at both ends, a valve at one end of said filter body for closing the passageway therethrough, a movable filter section at the other end of said filter body extending across the opening therein, and a thermostat intermediate the ends of said filter body and connected with said valve and said filter section.

6. A filtering device for filtering fluid flowing through a passageway, comprising a filter body open at both ends, a valve at one end of said filter body for closing the passageway therethrough, a movable filter section at the other end of said filter body extending across the opening therein, and a thermostat intermediate the ends of said filter body and connected with said valve and said filter section, the connection of the thermostat with the filter section permitting the valve to be opened before the filter section is moved.

7. A filtering device for filtering fluid flowing through a passageway, comprising a filter body open at both ends, a valve at one end of said filter body for closing the passageway therethrough, a movable filter section at the other end of said filter body extending across the opening therein, a thermostat intermediate the ends of said filter body and connected with said valve and said filter section, the connection between the thermostat and the filter section comprising a stem extending through the filter section and movable with relation thereto, said stem being connected with the thermostat, and an engaging device on said stem which engages the filter section after the valve has been opened, so as to move the filter section to its open position.

8. A filtering device for filtering fluid flowing through a passageway, comprising a filter body open at both ends, a valve at one end of said filter body for closing the passageway therethrough, a movable filter section at the other end of said filter body extending across the opening therein, a thermostat intermediate the ends of said filter body and connected with said valve and said filter section, the connection between the thermostat and the filter section comprising a stem extending through the filter section and movable with relation thereto, an engaging device on said stem which engages the filter section after the valve has been opened, so as to move the filter section to its open position, and a spring for returning the filter section to its closed position.

ELMER J. PRATT.